US006876101B1

(12) United States Patent
Knez

(10) Patent No.: US 6,876,101 B1
(45) Date of Patent: Apr. 5, 2005

(54) DEVICE FOR TRANSDUCING OF POWER

(76) Inventor: Jordan Knez, Andregatan 16, S-302 23 Halmstad (SE)

( * ) Notice: Subject to any disclaimer, the term of this patent is extended or adjusted under 35 U.S.C. 154(b) by 284 days.

(21) Appl. No.: 10/130,954
(22) PCT Filed: Nov. 16, 2000
(86) PCT No.: PCT/SE00/02249
    § 371 (c)(1),
    (2), (4) Date: May 24, 2002
(87) PCT Pub. No.: WO01/38731
    PCT Pub. Date: May 31, 2001

(30) Foreign Application Priority Data

Nov. 24, 1999 (SE) .............................................. 9904266

(51) Int. Cl.[7] .............................................. F03D 9/00
(52) U.S. Cl. .......................................... 290/55; 290/44
(58) Field of Search ..................................... 290/55, 44

(56) References Cited

U.S. PATENT DOCUMENTS

| 4,289,970 A | * | 9/1981 | Deibert | 290/44 |
| 4,330,714 A | * | 5/1982 | Smith | 290/55 |
| 4,678,923 A | * | 7/1987 | Trepanier | 290/55 |
| 4,684,817 A | * | 8/1987 | Goldwater | 290/55 |
| 5,436,508 A | * | 7/1995 | Sorensen | 290/55 |
| 5,910,688 A | * | 6/1999 | Li | 290/55 |
| 6,064,123 A | * | 5/2000 | Gislason | 290/55 |
| 6,072,244 A | * | 6/2000 | Tonouchi | 290/55 |
| 6,191,496 B1 | * | 2/2001 | Elder | 290/55 |
| 6,239,507 B1 | * | 5/2001 | Douthit | 290/55 |
| 6,452,287 B1 | * | 9/2002 | Looker | 290/55 |
| 6,555,931 B2 | * | 4/2003 | Mizzi | 290/54 |

* cited by examiner

Primary Examiner—Thomas M. Dougherty
Assistant Examiner—H. Elkassabgi
(74) Attorney, Agent, or Firm—Antonelli, Terry, Stout & Kraus, LLP

(57) ABSTRACT

A device for converting or transducing wind power into other power, such as electric power. A wheel is rotatably journalled on a shaft (8) in the upper region of a tower (1). The wheel has a number of blades (9) between the shaft (8) and an outer annulus (10) which is located a distance from the shaft (8). The tower (1) is rotatable for positioning the wheel substantially at right angles to the prevailing direction of the wind. A transmission device (26) extends between the annulus (10) of the wheel and the foot of the tower for transducing the transmitted wind power into other power.

10 Claims, 11 Drawing Sheets

DEVICE FOR TRANSDUCING OF POWER

The present invention relates to a device for converting and/or transducing power into other power, for example electric power.

According to the state of art, wind power is transduced by means of propeller or screw blades which depart from a shaft which drives a generator by the intermediary of a gear. This solution entails that the mechanical components are subjected to extreme mechanical forces which, naturally, become greater and greater the larger the propeller blades and the higher the tower. The tower has an upper nacelle which is rotary and which houses the mechanical components and the generator as well as the propeller shaft with the propeller or screw blades which are rotary for adjustments of the propeller blades substantially at right angles to prevailing direction of the wind. The extreme mechanical forces also a clear tendency to limit the size of a wind power station according to the state of art, whereby the economic return on wind power is considerably limited. For a truly efficient utilization of wind power, it has proved to be desirable to realise considerably larger wind power plants whereby the tower proper should preferably be 100 m tall perhaps preferably taller in order to permit a considerable thickness of the propeller blades. In addition, the possibilities of a uniform and stable wind speed are greater the higher up in the atmosphere the propeller blades or rotor can be placed.

The task forming the basis of the present invention is to realize a construction which great improves the possibilities of extracting wind power which, moreover, makes for the construction of considerably taller and larger plants than hitherto.

This task is solved according to the present invention in that the device by way of introduction has been given the characterising features as set forth in appended claim. 1.

Through the present invention it is possible to design and build a wind power plant providing the possibility of considerably greater energy yield than is possible to achieve employing a prior art wind power plant. Through the present invention, it is possible to build considerably taller and larger wind power plants than has hitherto been possible according to the state of the art. As a result of the peripheral transmission of the power from the rotor with the aid of one or more belts to a generator or other energy transducer placed in the foot of the tower, it is possible to dispense with many of the mechanical components which are required in prior art wind power plants. The placing of the energy traducers in the foot of the tower greatly contributes in making for the uptake of mechanical forces. The enclosure of the rotor by means of a casing wall also affords a high degree of protection. Further, the rotor proper may be made extremely robust and efficient, since the tips of the blades are rotatably journalled in the annulus and on the rotor shaft or a hub disposed on the rotor shaft. Naturally, the blades must be adjustable for efficiently utilising the prevailing wind speed.

The present invention will now be described in greater detail hereinbelow, with reference to the accompanying Drawings.

Figure 1:
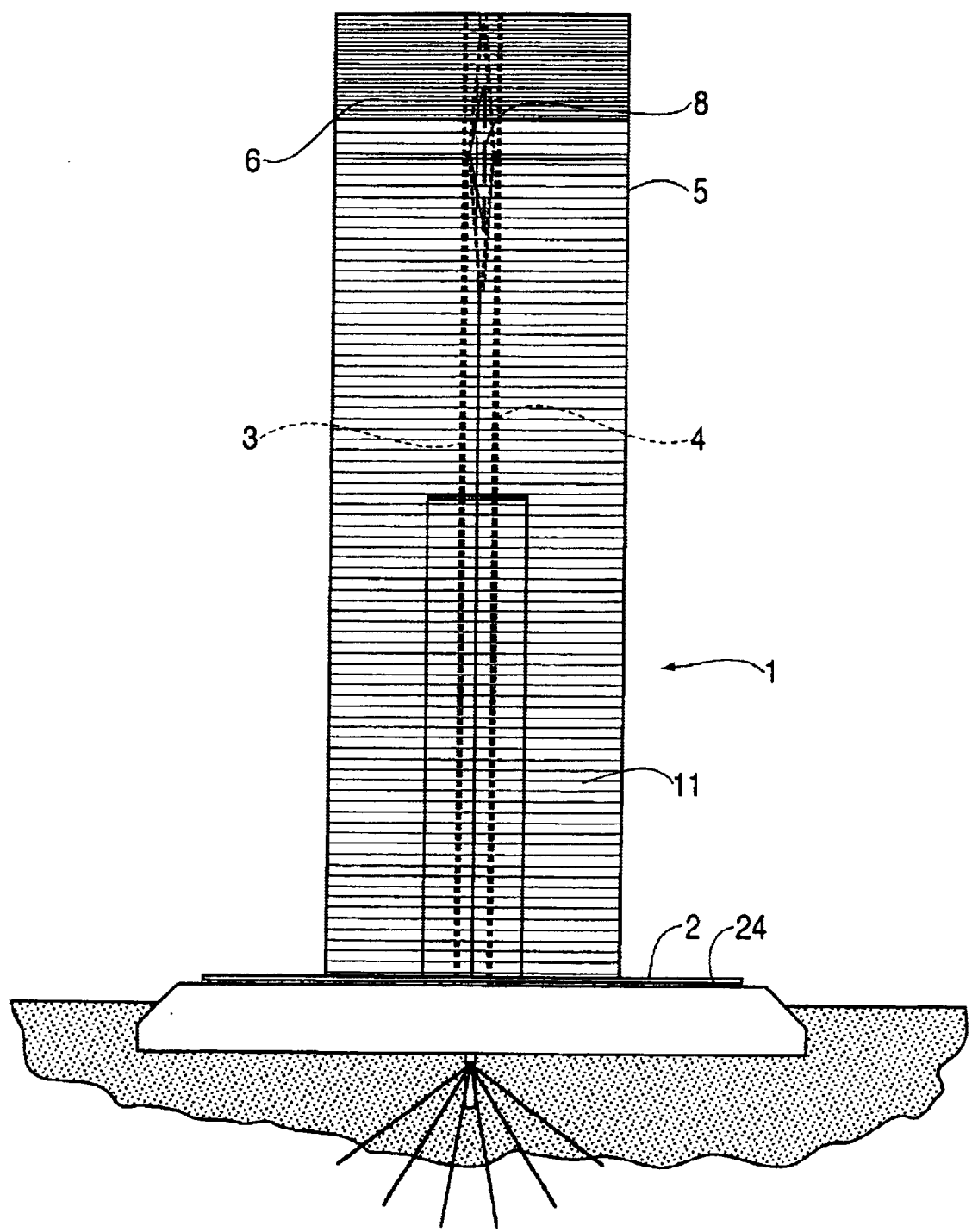
FIG. 1 is a side elevation of one embodiment of the device according to the present invention.
Figure 2:
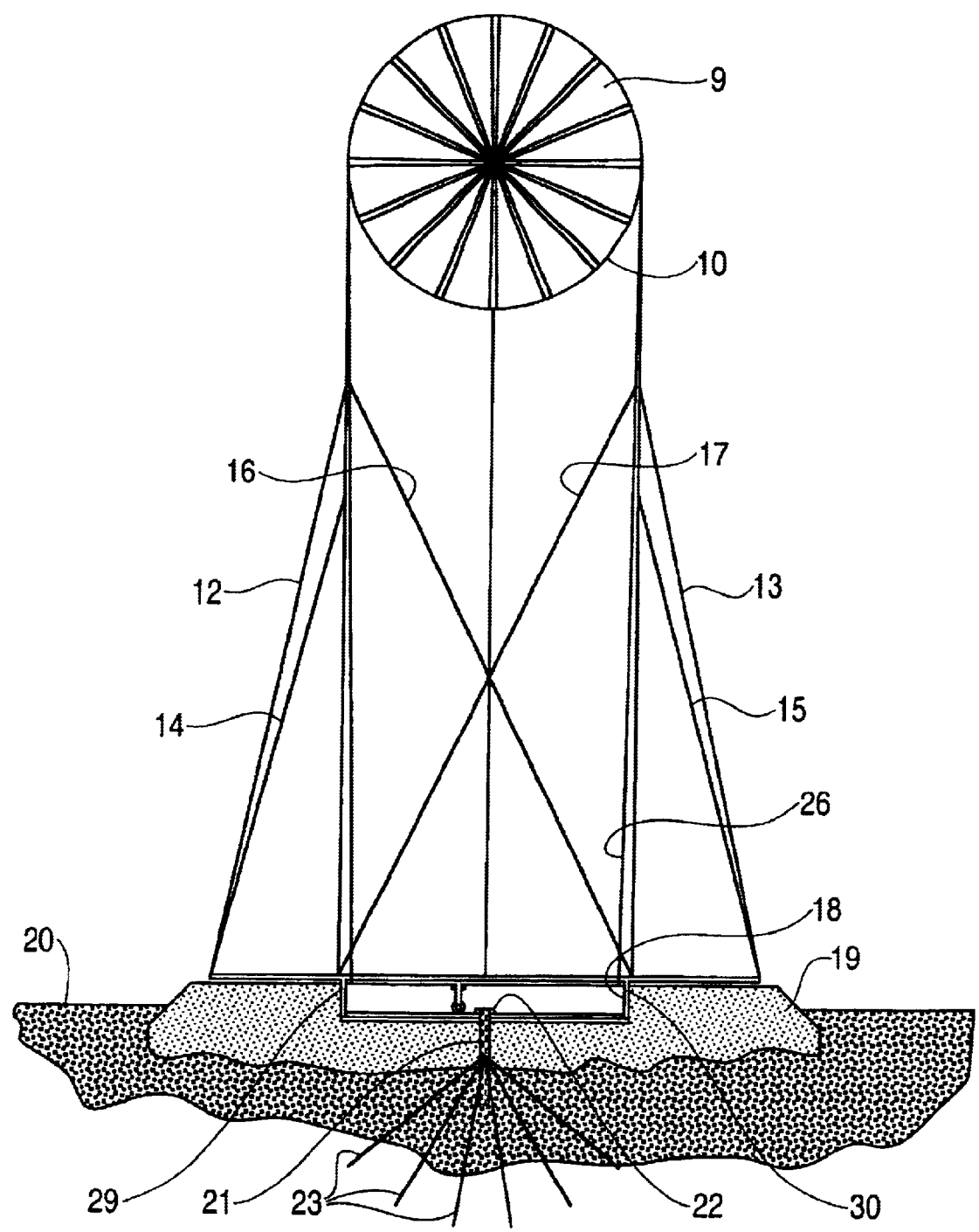
FIG. 2 is a front elevation of the embodiment of the device according to the present invention illustrated in FIG. 1.
Figure 3:
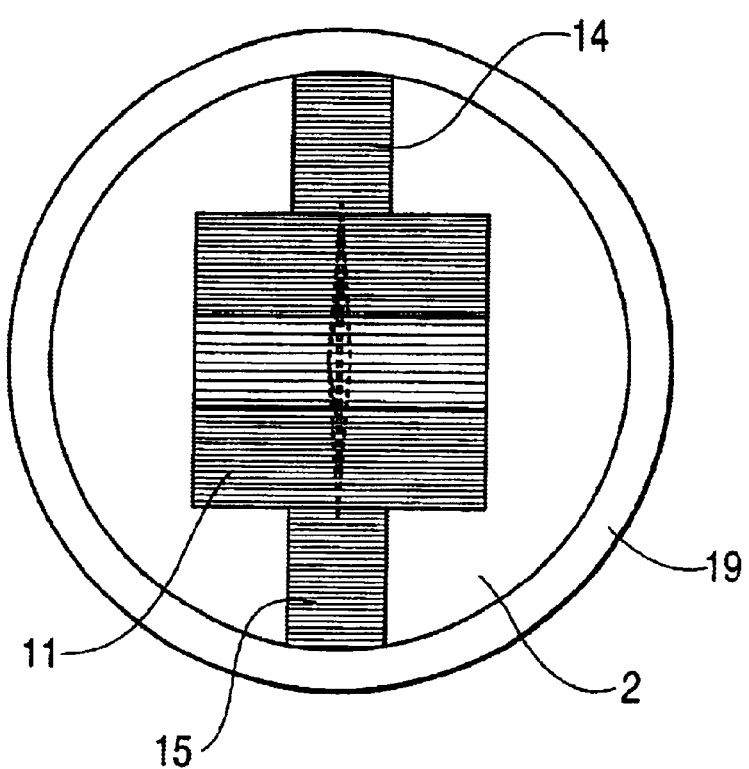
FIG. 3 is a top plan view of the embodiment of the device according to the present invention shown in FIGS. 1 and 2.
Figure 4:
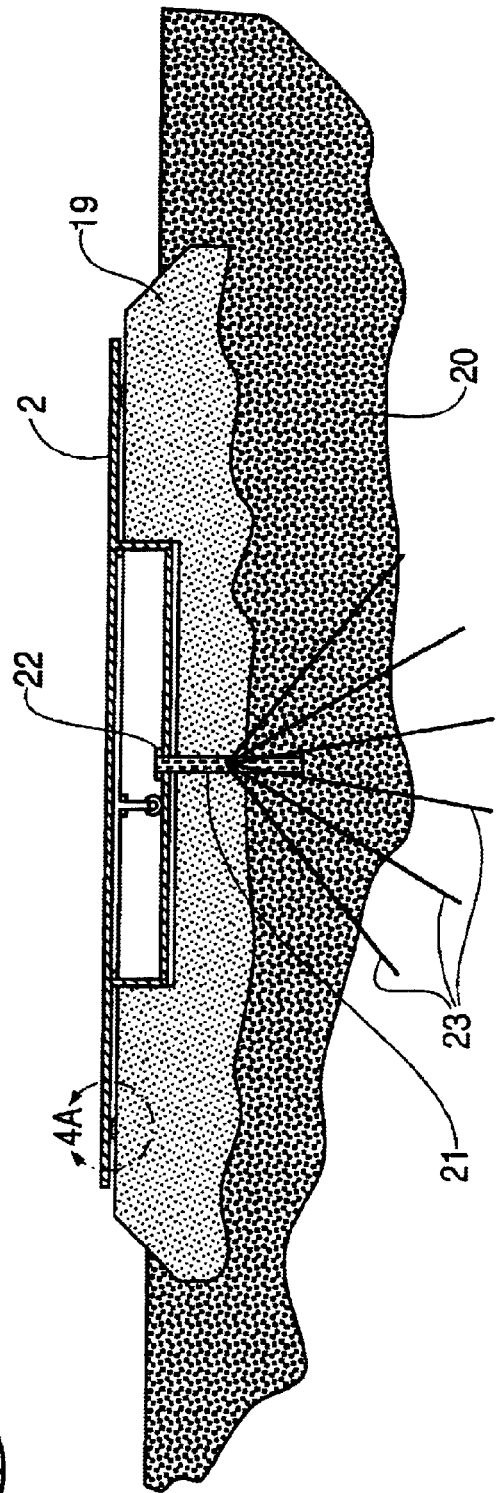
FIG. 4 is a section, on a larger scale, of a part of the foot of the embodiment of the device according to the present invention illustrated in FIG. 2.
Figure 5:
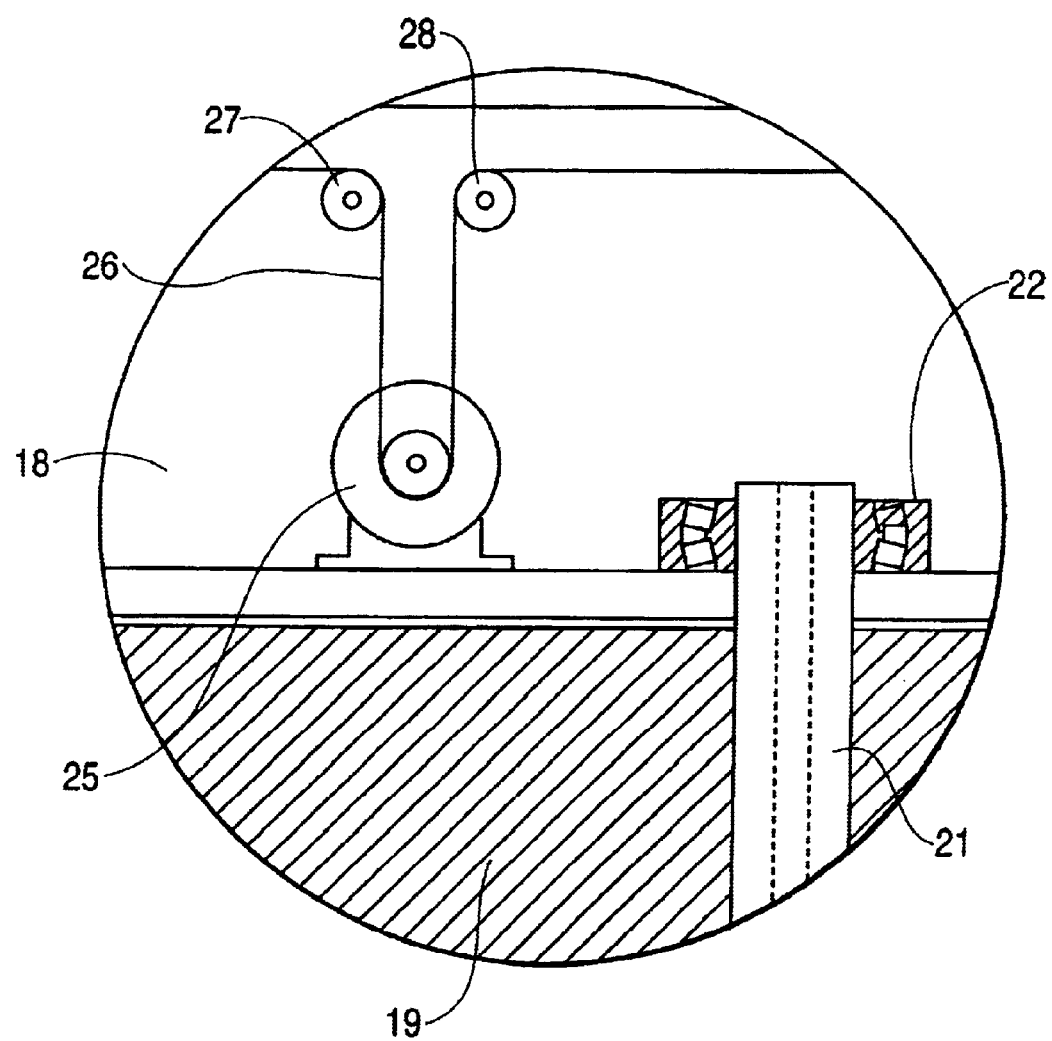
FIG. 5 is a section, on a larger scale, of a part of the foot illustrated in FIG. 4.
Figure 6:
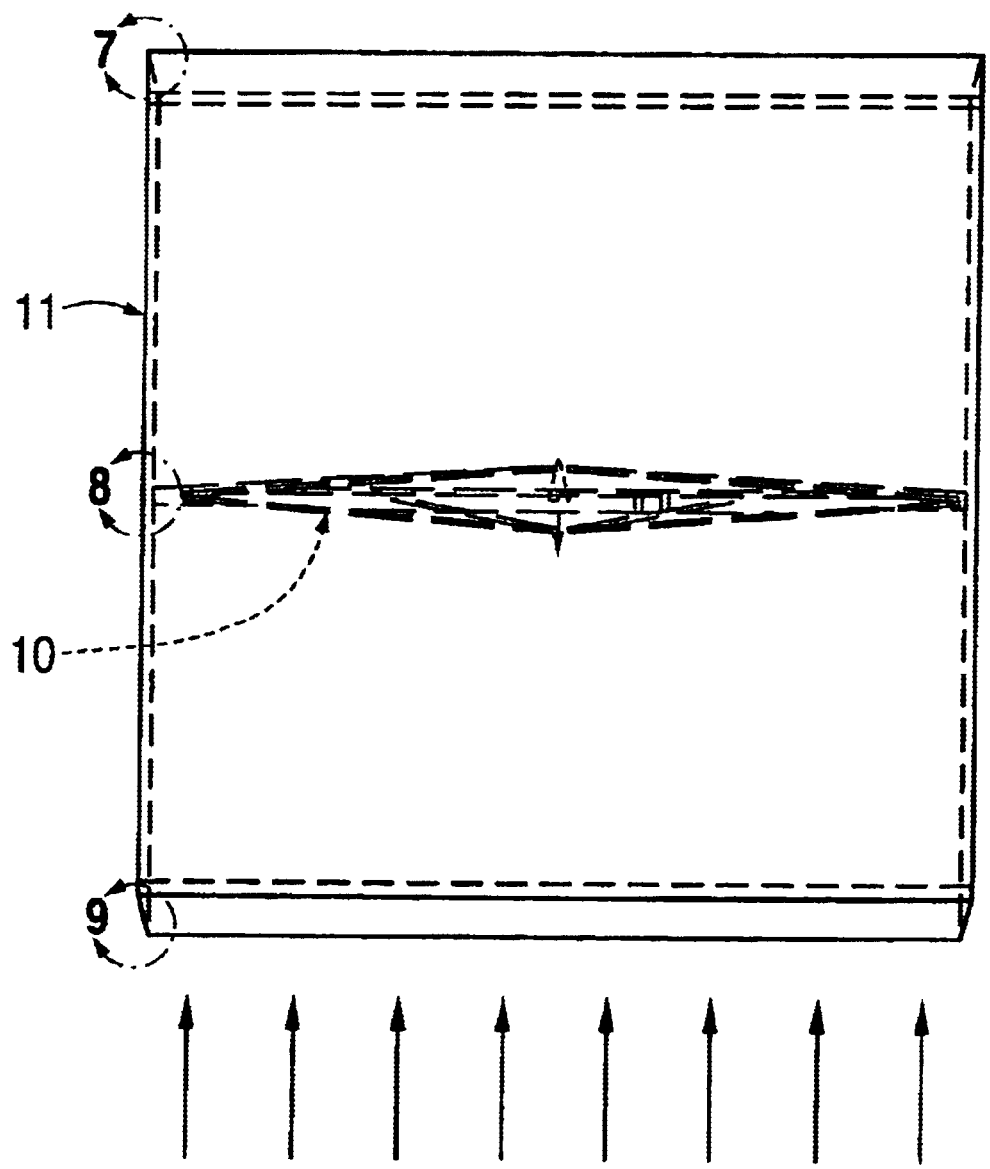
FIG. 6 is view from above or beneath of another embodiment of the device according to the present invention.

The prototype of the device according to the present invention shown on the Drawings is intended for converting or transducing wind energy into electric power or, as it may also be expressed, may be utilised as a wind power plant for the production of electric power. Principally according to FIGS. 1 and 2, the prototype of the device according to the present invention displays a tower 1 which is built on a turntable or a foot 2. The illustrated prototype of the tower 1 has two inner posts 3 and 4 which extend from the bottom to the top, and two horizontal upper struts 5 and 6 between the posts 3 and 4, and a shaft 8 extends between the horizontal struts 5 and 6 and supports a rotor wheel which consists of a number of blades 9 extending between the shaft 8 and a peripheral annulus 10. The blades 9 are rotatably disposed direct on the shaft 8 or on a hub journalled on the shaft 8 and the annulus 10 in order for the pitch of the blades 9 to be adjustable or variable in relation to the prevailing wind speed or some other desirable parameter, e.g, the frequency of produced electric power, with the aid of means per se known for this purpose.

A casing wall 11 extends from the foot 2 up over the rotor 9 with the annulus 10 and down on the other side thereof to the foot 2. The posts 3 and 4 and horizontal struts 5 and 6 extended out to the casing wall 11. The casing wall 11 has two outer guy wires 12 and 13 and two outer stay walls 14 and 15, and also tow inner, intersecting guy wires 16 and 17. The guy wires 16 and 17 may be centrally united and may be of duplex design for cooperation with posts 3 and 4 and, in such an event, possibly be secured therein.

The turntable 2 has an engine room 18 which is recessed down in a platform 19, for example, of concrete, which in turn is disposed on a substrate 20 which may consist of the ground surface, but, naturally, there is nothing to prevent the platform 19 from having the form of a caisson which is anchored on a sea floor or the like. The turntable 2 and the machine room 18 are journalled on a centrally placed shaft 21 by the intermediary of a bearing 22 suitable for the purpose. The shaft 21 is anchored by means of anchors 23 suitable for this purpose. The turntable 2 is further journalled on the platform 19 in the proximity of its periphery by means of suitable sliding or rolling bearings 24. They may also be rollers or wheels which cooperate with a path or track and/or a rail.

A generator 25 is placed in the machine room 18 and is driven by means of one or more belts 26, wires or like which, by the intermediary of suitable bending rollers 27, 28, 29, 30 extend through the machine room 18, along the casing wall 11 up to the rotor or wheel annulus 10, over this and back along the opposing casing wall 11 to the machine room 18. Suitable auxiliary devices may further be provided in the machine room 18 for maintaining a predetermined tensioning in the belt or belts 26.

The machine room 18 may house all of the equipment which is required for revolving the tower 1 to the most suitable position possible for the prevailing wind direction and for managing the electric power generated by the generator 25, and the power may be extracted from the machine room 18 via suitable cables through, for example, the shaft 21 which, in such instance, may be hollow.

The casing wall 11 is advantageously built from a lattice construction which may wholly or partly be clad with sheet metal. In the casing wall 11, there is advantageously provided a channel for the belt or belts 26. Rollers are provided in the channel for guiding the belt or belts 26. The peripheral wheel annulus extends into the channel in the upper portion of the casing wall 11. Both the belt or belts 26 and the annulus will thus be protected against the action of different types of weather and other factors.

The casing wall 11 may further be in the form of a drum about the annulus or rotor. The drum may be designed in an aerodynamically suitable manner so that the wind effect on the rotor will be as favourable as possible. The drum is, for example, supported by a suitable lattice construction. It may prove to be appropriate to build a generator around the annulus or the rotor.

FIGS. 6–9 show the casing wall 111 and parts thereof. It will be clearly apparent that the casing wall 11 is of double wall design and that the belt 26 or belts are guided in a space therein, which is defined by beams 31 and 32, with the aid of rollers 33 and 34. The inlet edge is shown in greater detail in FIG. 9, the inner wall 35 being straight and the outer wall 36 being conical towards the inner wall, while the outlet edge is shown in greater detail in FIG. 7, the outer wall 36 being straight and the inner wall 35 being conical out towards the outer wall 36. This is of particular importance when the casing wall 11 surrounds the annulus 10 as a drum.

Figure 7:
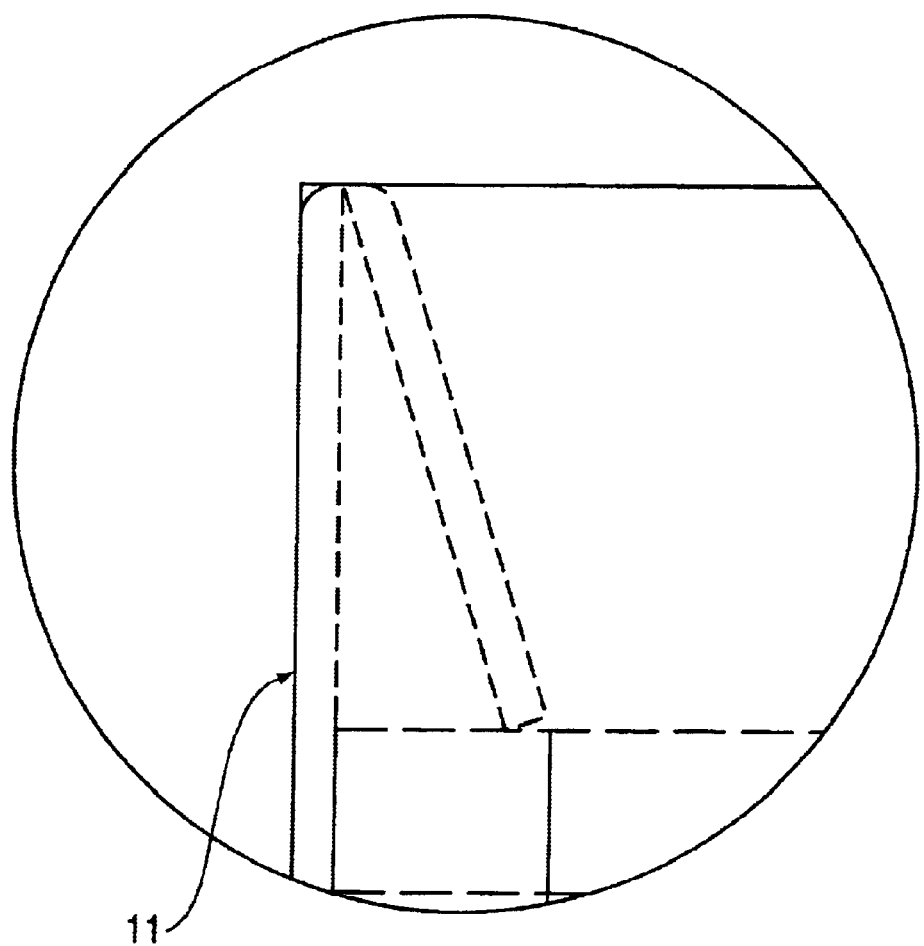
FIG. 7 shows, on a larger scale, a view of a part of the outlet edge of the casing around the wheel.
Figure 8:
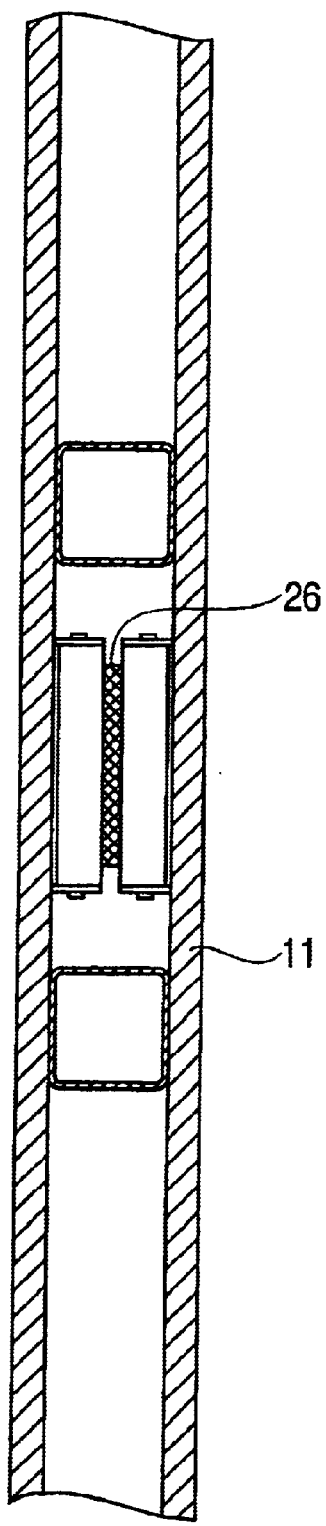
FIG. 8 shows, on a larger scale, a section of the casing wall at the belt or belts.
Figure 9:
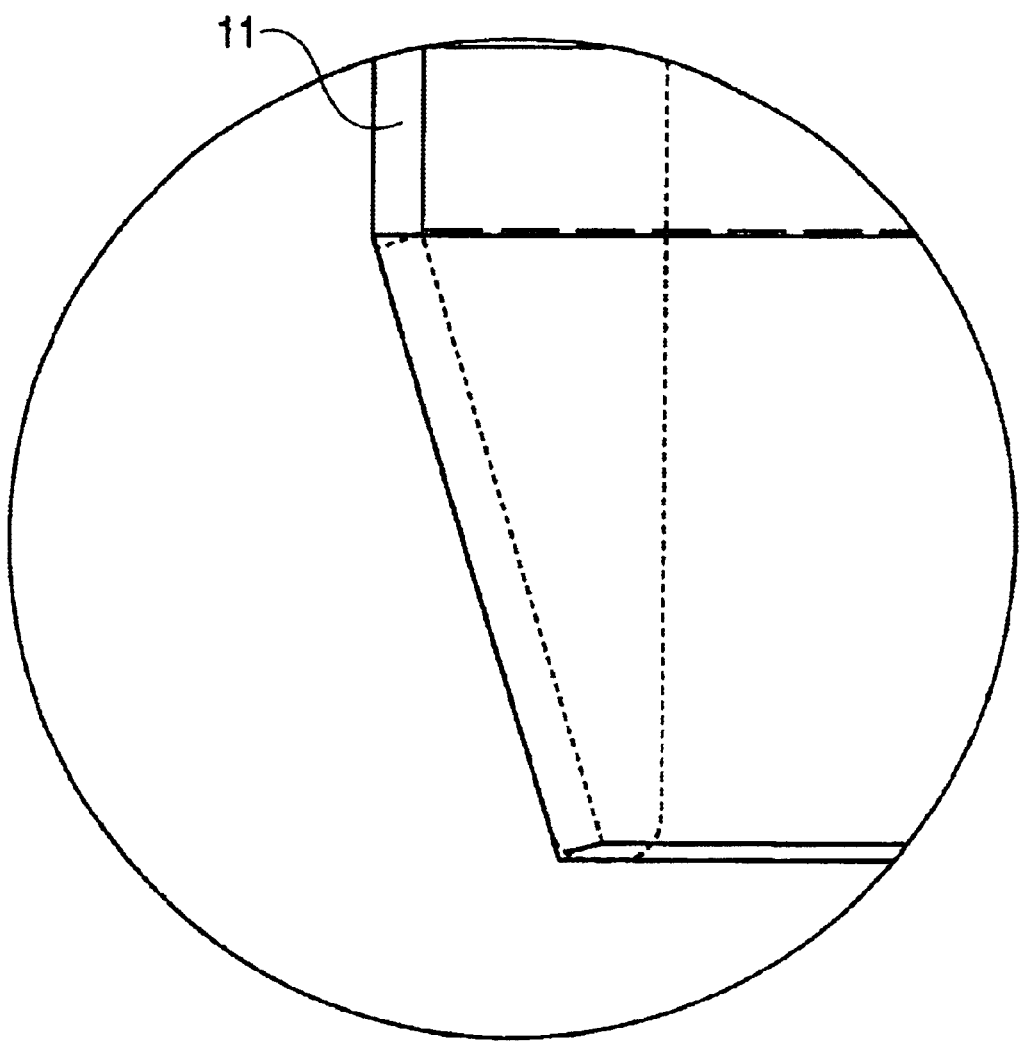
FIG. 9 shows, on a larger scale, a view of a part of the inlet edge of the casing around the wheel.
Figure 10:
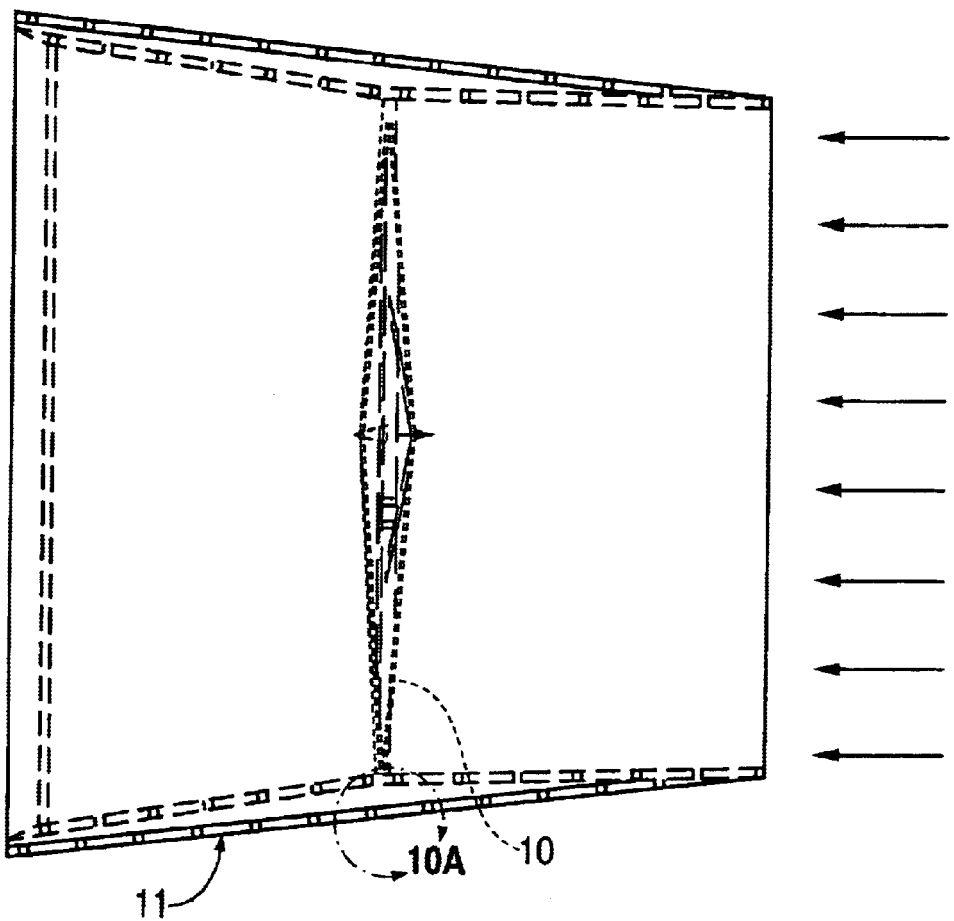
FIG. 10 is a view from above or beneath of yet a further embodiment of the device according to the present invention, with a part shown on a larger scale.
Figure 10A:
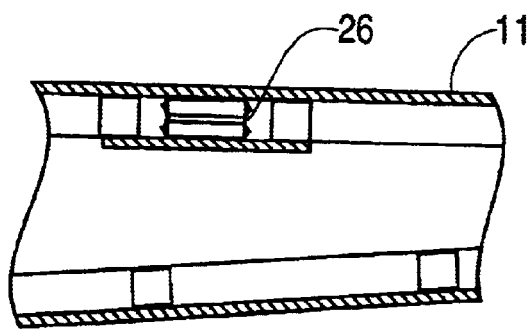

FIG. 10 shows one embodiment of casing wall 11 of conical configuration or flaring from the inlet side towards the outlet side, in which event the inlet edge may be sharp as shown, or conical as in FIG. 9, while the outlet edge is conical largely as in FIG. 7. Also in this case, the casing wall 11 may suitably surround the annulus 10 as a drum.

Figure 11:
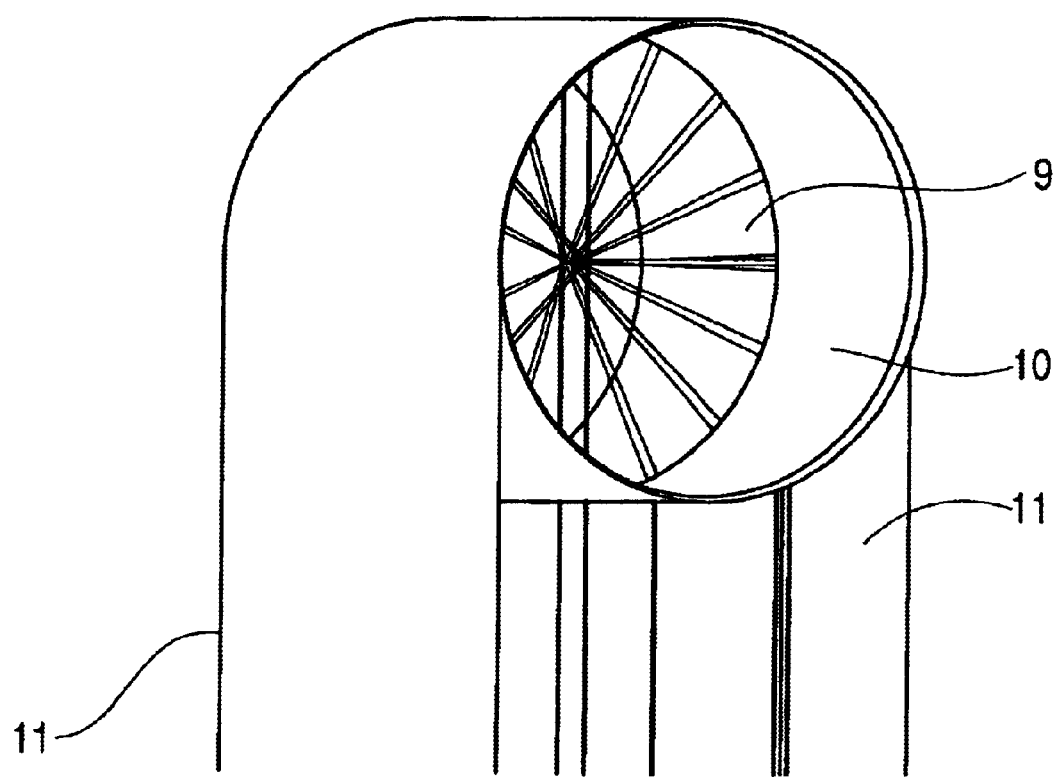
FIG. 11 is a view of the annulus enclosure having a configuration of the blades within a casing wall structure.

An enclosure of the annulus 10 is illustrated in FIG. 11.

Many modifications are naturally possible without departing from the inventive concept as defined in the appended Claims. For example, the number of blades 9 may be substantially optionally selected, from two blades up to the illustrated number of blades or any other number of blades. Further, the configuration of the blades 9 may be varied, like the rotary mounting of the blades on the shaft 8 and in the annulus 10. The casing wall 11, like the stay walls 14 and 15, may display many other configurations than that illustrated. The staying of the tower 1 may also be varied to a considerable degree, like many of the other details and components shown on the Drawings.

I claim:

1. A device for converting and/or transducing wind power, into other power e.g. electric power, characterised in that the wheel is rotatable journalled on a shaft (8) in the upper region of tower (1); that the wheel is provided with a number of blades (9) between the shaft (8) and outer annulus (10) which is located a distance from the shaft (8); that the tower (1) is rotary for positioning of the annulus substantially at right angle to the prevailing direction of the wind; that the tower (1) has a casing wall (11) which extends about at least a part of the annuals; and the transmission means (26) are disposed between the annuls (10) of the wheel and means (25) for transducing the transmitted wind power into other power; e.g. electric power, in which said means is a generator.

2. The device as claimed in claim 1, characterised in that the casing wall (1) extends from each side of the annuls down to the foot (2) of the tower.

3. The device as claimed in claim 1, characterised in the wheel shaft (8) extends thru the two struts (5, 6) at the upper region of the tower (1).

4. The device as claimed in claim 3, characterised in that the strut or struts (3, 4) extend from the upper regions of the tower (1) to the foot (2).

5. The device as claimed in claim 1, characterised in the wall stays (14, 15) and/or guy stays (12, 13, 16, 17) are disposed between the foot (2) and the casing wall (11) on the outside and/or inside thereof.

6. The device as claimed in claim 1, characterised is that the transmission means is a belt (26) which extends about the annuls, along the casing wall (11), to the foot (2) an along the foot (2) to a drive wheel on a drive shaft of said transducer means (25).

7. The device as claimed in claim 6, characterised in that the means are provided for maintaining a predetermined tension of the belt (26).

8. The device as claimed in claim 1, characterised is that the blades (9) extending between the hub of the wheel and the annulus (10) are rotary for adapting the speed of reaction of the wheel to a predetermined speed in relation to the prevaling wind speed or any other desired parameter.

9. The device as claimed in claim 1, characterised is that the foot (2) of the tower (1) is the form of a turntable with a machine room (18) for the transducer mean, and possible means for maintaining the tensioning in the belt or belts (26).

10. The device as claimed in claim 1, characterised in that said means for transducing the transmitted wind power are located at the foot (2) of the tower (1); and that said transmission means (26) extended between the annulus (10) of the wheel and said transducer means (25) at foot (2) of the tower (1).

* * * * *